United States Patent
Mäurer et al.

(10) Patent No.: US 10,934,410 B2
(45) Date of Patent: Mar. 2, 2021

(54) METHOD FOR RECYCLING POLYOLEFIN CONTAINING WASTE

(71) Applicant: FRAUNHOFER-GESELLSCHAFT ZUR FÖRDERUNG DER ANGEWANDTEN FORSCHUNG E. V., Munich (DE)

(72) Inventors: Andreas Mäurer, Freising (DE); Martin Schlummer, Ingolstadt (DE); Fabian Knappich, Munich (DE); Tanja Fell, Freising (DE); Arthur Berrang, Freising (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/340,402

(22) PCT Filed: Sep. 13, 2017

(86) PCT No.: PCT/EP2017/072963
§ 371 (c)(1),
(2) Date: Apr. 9, 2019

(87) PCT Pub. No.: WO2018/068973
PCT Pub. Date: Apr. 19, 2018

(65) Prior Publication Data
US 2019/0233609 A1    Aug. 1, 2019

(30) Foreign Application Priority Data
Oct. 10, 2016  (EP) .................................... 16193068

(51) Int. Cl.
*C08J 11/08*     (2006.01)
*B29B 17/02*    (2006.01)
*B29K 23/00*    (2006.01)

(52) U.S. Cl.
CPC .............. *C08J 11/08* (2013.01); *B29B 17/02* (2013.01); *B29B 2017/0203* (2013.01); *B29B 2017/0293* (2013.01); *B29K 2023/00* (2013.01); *C08J 2323/02* (2013.01); *C08J 2323/06* (2013.01); *C08J 2323/08* (2013.01); *C08J 2323/10* (2013.01); *C08J 2323/12* (2013.01); *Y02W 30/62* (2015.05)

(58) Field of Classification Search
USPC ........................................................... 521/47
See application file for complete search history.

(56) References Cited

U.S. PATENT DOCUMENTS

| | | |
|---|---|---|
| 4,031,0339 | 6/1977 | Mizumoto et al. |
| 4,594,371 A | 6/1986 | Nauman |
| 4,666,961 A | 5/1987 | Nauman |
| 8,225,937 B2 | 7/2012 | Schlummer et al. |
| 2003/0146547 A1 | 8/2003 | Fischer et al. |
| 2008/0190819 A1 | 8/2008 | Schlummer et al. |

FOREIGN PATENT DOCUMENTS

| | | |
|---|---|---|
| DE | 220 609 A1 | 4/1985 |
| EP | 0 664 314 B1 | 1/2002 |
| EP | 2 384 873 A1 | 11/2011 |
| WO | WO 02/48244 A1 | 6/2002 |
| WO | WO 03/106546 A1 | 12/2003 |
| WO | WO 2011/082802 A1 | 7/2011 |

OTHER PUBLICATIONS

*Hansen Solubility Parameters—A User's Handbook*, 2nd Edition, Charles Hansen, Editor, CRC Press, Boca Raton, FL, (2007), 546 pages.
European Patent Office, International Search Report in International Application PCT/EP2017/072963 (dated Oct. 16, 2017).
European Patent Office, Written Opinion in International Application PCT/EP2017/072963 (dated Oct. 16, 2017).
International Bureau of WIPO, International Preliminary Report on Patentability in International Application PCT/EP2017/072963 (dated Apr. 25, 2019).

*Primary Examiner* — Terressa Boykin
(74) *Attorney, Agent, or Firm* — Leydig, Voit & Mayer, Ltd.

(57) ABSTRACT

Disclosed is a method for recycling polyolefin containing waste by using a solvent with a specific Hansen parameter and contacting this mixture with a liquid filtration aid before separating the polyolefin from the mixture. The method includes the steps of mixing the polyolefin containing waste with a solvent having a Hansen parameter $\delta_H$ from 0.0 to 3.0 MPa$^{1/2}$; contacting this mixture with a liquid filtration aid having a Hansen parameter $\delta_H$>4.0 MPa$^{1/2}$; and separating the polyolefin from the mixture.

20 Claims, 2 Drawing Sheets

METHOD FOR RECYCLING POLYOLEFIN CONTAINING WASTE

CROSS-REFERENCE TO RELATED APPLICATIONS

Figure 1:
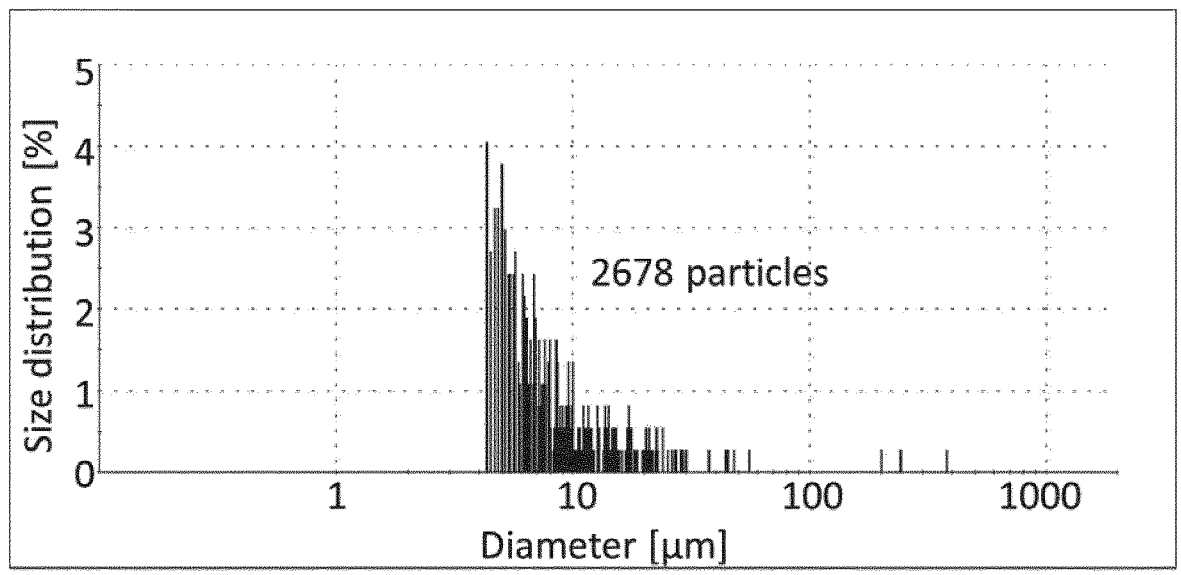

This patent application is the U.S. national phase of International Application No. PCT/EP2017/072963, filed on Sep. 13, 2017, which claims the benefit of European Patent Application No. 16193068.0, filed Oct. 10, 2016, the disclosures of which are incorporated herein by reference in their entireties for all purposes.

The invention refers to a method for recycling polyolefin containing waste by using a solvent with a specific Hansen parameter and contacting this mixture with a liquid filtration aid before separating the polyolefin from the mixture.

Waste from garbage dumps is strongly heterogeneous in its composition and comprises many unpredictable components. As a result of this, polyolefins and also other raw materials can presently not be recycled from garbage dumps.

In industrialized countries heterogeneous polyolefin-rich waste streams are either recycled mechanically to give lower-quality products, e.g. polyolefin recycling from Green dot collections of packaging waste in Germany employed as substitute fuel or incinerated with or without energy recovery.

The commercial recycling process of PO-containing waste uses a mechanical recycling, i.e. recompounding. In recompounding, PE and PP waste are usually separated by automated near-infrared (NIR) spectroscopy. The sorted materials are compounded after various grinding, floating, washing and drying steps.

The disadvantage of this technique is that recompounding can only be applied for mono-material. Modern plastic packages are, however, often made from many different materials.

For flexible film packaging applications the majority of used plastics are mixtures by themselves. These mixtures are multilayers of compatible and incompatible polymers and cannot be re-compounded without the use of expensive modifiers. In addition to that, the products obtained by recompounding such materials exhibit worse mechanical properties than pure polymers and their compatible polymer blends.

Thus, with the increasing use of multilayer packaging the recycling of PO has become more difficult. Common separation techniques like spectroscopic or density sorting are not successful due to the complexity of these materials. Optical means only scan the material at the surface layer (ignoring deeper materials within a multilayer composite) and the effective density of a particle depends on the ratio and the types of polymer used for a multilayer. Thus, mixed polymers from multilayers are only recovered by downcycling and can only be used in low-value markets, e.g. thick plastic parts as substitute for cement bricks or profiles.

In contrast to these mechanical recovery approaches solvent-based recycling is selective for polyolefins and generates pure and high quality recovered polymers from mixed post-consumer waste.

Dissolution-based processes are mentioned in a variety of patents for polyolefin-containing waste streams. However, no process is currently available that recovers high-quality polyolefin products from post-use flexible multilayer waste of garbage dumps in a quality that is comparable to virgin polyolefin material and can replace the latter in the typical subsequent processing steps.

It is known from U.S. Pat. No. 4,031,039 (Mizumoto) and EP664314 B1 (Naumann 1990) to separate commingled post-consumer plastics with aromatic solvents (xylene, toluene) by selective dissolution. At first polystyrenic and second polyolefinic polymers are dissolved. In order to separate PVC Mizumoto used THF for post-extraction of the residue and Naumann proposed to use THF first (dissolution already at room temperature, incl. PS-extraction). All solvents mentioned therein are either aromatic or flammable low boiling (bp<115° C.) and do not show very high electrical conductivities which is hazardous due to the risk of electrostatic charging and/or explosion. Thus these techniques require strict and expensive safety measurements to protect human health and environment. Another disadvantage is the low selectivity of the disclosed solvents for the target polyolefins which makes a pre-extraction necessary. Alternatively, Naumann proposed microdispersing the incompatible co-extracted polymer (U.S. Pat. Nos. 4,666,961 and 4,594,371). Both approaches result in additional costs for the process and are only able to provide a limited product quality.

A further disadvantage is that the residual solvent traces which are foreign substances for virgin PO-qualities have a negative impact on the applicability of the recovered polymer.

Though there are efforts to pre-extract foreign polymers or to use more selective solvents or solvent mixtures, there are still traces of co-dissolved foreign polymers which will be concentrated (together with the target polymer) during the drying process in which the filtered polymers are separated from the solvent. At locally higher concentrations the foreign polymers are incompatible with the target polymer and result in undesired impurities, like stickies, crusts or gel-particles, in the recovered polymer in particular during melt drying and extrusion with high temperature and friction.

Such a melt filtration of target polymer gel after a first solvent separation is known from WO 2011/082802 A1.

It was therefore an object of the present invention to provide the recycling process with an increased selectivity for the polyolefin.

This problem is solved by the method disclosed herein.

It is provided a method for recycling of a polyolefin containing waste having the following steps:
  a) mixing the polyolefin containing waste with a solvent having a Hansen parameter $\delta_H$ from 0.0 to 3.0 $MPa^{1/2}$;
  b) contacting this mixture with a liquid filtration aid having a Hansen parameter $\delta_H$>4.0 $MPa^{1/2}$; and
  c) separating the polyolefin from the mixture.

The Hansen parameter $\delta_H$ is an acknowledged parameter which characterizes the solubility of a compound. For a variety of compounds the value of the Hansen parameter $\delta_H$ can be looked up in standard chemical books. The Hansen parameters $\delta_H$ mentioned in this patent application refer to the values tabulated in the following handbook: Hansen, C. M., Hansen Solubility Parameters—A User's Handbook, 2. Edition, CRC Press, Boca Raton, USA, 2007.

It is preferred that the polyolefin is selected from the group consisting of PE, PP, LDPE, HDPE, LLDPE and mixtures of those.

In a preferred embodiment the solvent is selected from the group consisting group consisting of hydrocarbon compounds, preferably aliphatic hydrocarbon compounds, more preferably cycloaliphatic, linear or branched hydrocarbon compounds, in particular cycloaliphatic, linear or branched hydrocarbons compounds with 5 to 18 carbon atoms and mixtures of those.

It is further preferred that the liquid filtration aid contains at least one fluid with a Hansen-parameter $\delta_H$ from 4.0 to 38.0 MPa$^{1/2}$, preferably from 10.0 to 35.0 MPa$^{1/2}$, more preferably from 20.0 to 33.0 MPa$^{1/2}$, that preferably forms a miscibility gap with the solvent and more preferably shows complete immiscibility with the solvent, in particular at least one fluid selected from the group consisting of mono-/polyhydroxy hydrocarbons with 2 to 12 carbon atoms, preferably with 3 to 5 carbon atoms, more preferably at least one fluid selected from the group consisting of 1-propanol, 2-propanol, 1-butanol, 2-butanol, 1-pentanol, 2-pentanol, 3-pentanol, 1,2-propanediol, 1,3-propanediol, 1,2-butanediol, 1,3-butanediol, 1,4-butanediol, 1,2-pentanediol, 1,3-pentanediol, 1,4-pentanedial, 1,5-pentanediol, 1,2,3-propanetriol, 1,2,4-butanetriol, 1,2,3-butanetriol, 2-(hydroxymethyl)-1,3-propanediol, 1,3,5-pentanetriol, 2,3,4-pentanetriol, 2-(hydroxymethyl)-2-methyl-propanediol, 2-propene-1-ol, propene-2-ol, 3-butene-1-ol, 2-buten-1-ol, 3-buten-2-ol, 1-butene-2-ol, (E)-2-Buten-1-ol, (Z)-2-Buten-1-ol, 2-methyl-2-propen-1-ol, 2-methyl-prop-1-en-1-ol, cyclopropylcarbinol, cyclobutanol, 1-penten-3-ol, 3-methyl-3-buten-1-ol, (Z)-2-penten-1-al, 3-methyl-2-buten-1-al, 2-methyl-3-buten-2-ol, (E)-2-penten-1-ol, 2-methyl-2-buten-1-ol, 4-penten-1-ol, 3-penten-2-al, 2-penten-1-ol, 4-penten-2-ol, (Z)-2-penten-1-ol, (Z)-3-Penten-1-ol, 3-methyl-3-buten-2-ol, 3-penten-1-ol, (E)-2-penten-1-ol, (E)-3-penten-1-ol, 2-methyl-3-buten-1-al, 2-penten-1-ol, pent-2-en-1-ol, 2-methyl-(E)-2-butenol, trans-3-penten-2-ol, 1-penten-3-ol, (Z)-pent-3-en-2-ol, (E)-pent-3-en-2-ol, prop-1-en-1,2-dimethyl-1-ol, 1-ethylcyclopropanal, 1-methylcyclopropanemethanol, cyclopentanol, cyclobutanemethanol, cyclopropylmethylcarbinol, 1,2-cyclopentanediol, and mixtures of those.

The at least one fluid contained in the liquid filtration aid can either show miscibility gaps with the solvent or is completely immiscible with the solvent. Complete immiscibility in the context of this patent application means that the fluid is only miscible with the solvent in a weight ratio of a maximum of 10 wt.-%.

Preferably, the polyolefin containing waste is selected from the group consisting of green dot collection waste, industrial waste, post-consumer waste, household-waste, bulky waste, packaging waste, rigid plastic waste and mixtures thereof and comprises or consists of multilayered plastic material and contaminant, wherein the multilayered plastic material contains at least one layer with at least 80.0 wt.-% of a polyolefin and at least another layer with at least 80.0 wt.-% of an other polymer or polymer blend and, optionally, a further layer comprising more than 20.0 wt.-% metal and/or paper.

In a preferred embodiment the other polymer or polymer blend is selected from the group consisting of polyesters, polyethers, polyvinylacetate, polyvinylalcohols, ethylenevinylalcohols, polyamides, polyacrylates, polycarbonates, polyurethanes, aromatic polymers, preferably polystyrene, polyvinylchloride, polyvinylbutyrate, polybutadiene and its blends or copolymers.

The contaminant is preferably selected from the group consisting of glass, fillers, flame retardants, papers, colourants, printing inks, whiteners, such as titanium dioxide, bonding agents (e.g. tie layers), coatings, inert contaminants, foams, adhesives, metals, heavy metals, volatile organic substances, aromatic substances, halogenated aromatic substances, halogenated hydrocarbons, biologically degradable dirt, residual foodstuff, wood, textile fibres, natural fibres and its mixtures.

A mixture of step a) comprises preferably from 2.0 to 40, more preferably 5.0 to 15 wt.-% polymer.

It is preferred that a temperature of 75 to 200° C., preferably a temperature of 90 to 160° C., is applied in steps a) to b). The temperature is selected carefully not to have a sudden evaporation of water but to achieve preferably low viscosities in order to keep the process safe, technically as simple as possible and adaptable to variations in polyolefin content.

It is preferred that a temperature of 25 to 260° C. is applied in step c).

Preferably, method according to one of the preceding claims, characterized in that the contacting time with the liquid filtration aid in step b) is at least 0.5 min, preferably from 1.0 to 180 min, more preferably from 3.0 to 100 min, in particular 5.0 to 60 min. The contact time is adaptable to variations in polyolefin content, degree of contamination, operation mode (continuous or batch wise) and service life of optional downstream police filter unit and/or fine filter unit in order to optimize the maintenance work (reduced downtime and/or manual handling) and to maximize the process efficiency.

It is preferred that the volume of the liquid filtration aid in step b) is from 0.5 to 100 wt.-%, preferably from 2.0 to 40 wt.-%, in relation to the mixture of waste and solvent coming from step a). Furthermore, apart from the purification ability, the high heat conductivity of the liquid filtration aid reduces the safety risk of the process.

It is preferred that the mixture is subjected to a separation process prior to step c), preferably a multi-step separation process, more preferably selected from the group consisting of a filtration process, in particular a filtration process using a sieve or a gap-filter with gaps from 1 to 5000 μm, a sedimentation, a centrifugation and a decantation process and/or combinations thereof.

Following a possible additivation, the separation in step c) is preferably effected by evaporation of the solvent or by addition of a precipitant followed by precipitation and mechanical separation of the polyolefin. The additivation can be done in order to influence colour, surface properties, thermal/mechanical stability of the polymer (e.g. by adding pigments, masterbatches, non-organic particles, stabilizers etc.).

In a preferred embodiment the separated polyolefin is directly fed into an extruder and processed to a polyolefin granulate compound or masterbatch or film or the polyolefin is dried in a drying process and cooled to room temperature.

The present invention is described in more detail with respect to the following examples. These are examples according to the invention (A3 and B5) and examples according to the state of the art (A1, A2 and B1-4). The examples should contribute to the general understanding of the invention. The invention should, however, not be limited to the examples.

EXAMPLE A

PE from Post-Industrial Film Waste

Multilayer packaging films have been cut into pieces of approximately 1-5 cm$^2$ and used as input samples. All input samples have been dissolved by a multifold polyolefin-extraction in several 100 mL and 1 L batches. The temperature that has been applied in this extraction step in order to dissolve PE is 100-125° C. The residence time which was found sufficient for a complete extraction of PE was 15-30 min.

A1) Coarse filtration without filtration aid

After extraction of the waste material the extract solution has been filtered coarsely by means of simple tea strainers with two different sieve sizes, 500 µm and 100 µm, respectively).

From the $TiO_2$-pigmented multilayer film, the achieved filtered PE-solutions were white coloured. These solutions were dried. The resulting PE-powders were molten with a melt-flow-index-equipment (MFI-equipment). X-ray fluorescence (XRF) measurements were performed to check the content of $TiO_2$-pigments. A titanium content of 2.2 wt.-% Ti has been found.

A2) Fine filtration without filtration aid

As an effect of the different colour of some input samples the extracted PE-dispersion (solution with impurities) was coloured light yellow or pink from dissolved parts of the colouring ink.

In order to achieve a white or even natural non-coloured PE, the yellow/pink hot extract solution has been filtered by means of a 1-L heated pressurized (cake) filtration (Temp. 110° C.; 0.3-2 bar; Seitz® depth filter sheet T1500, 28 cm$^2$ filter area). The filter showed a pore size of less than 5 µm and was successful in removing some of the $TiO_2$-pigments. Solutions with a weight ratio of 4.0 to 8.0% PE could be filtered easily with a fresh filter device, but repeatedly after filtration of 70-85 g of white-pigmented PE (depending on concentration this number correlates to from 1000 to 1750 g of PE-dispersion) the filter was blocked.

The MFI-strand which has been produced after drying was still white. The XRF-measurement which was performed to check the content of $TiO_2$-pigments revealed a titanium content of 1.3 wt.-% Ti.

A3) Improved fine filtration with filtration aid

After extraction of the waste material a filtration aid has been added to the extract solution. The mixture of extract solution and filtration aid has been separated by sedimentation and filtered by means of a 1-L heated pressurized (cake) filtration (Temp. 110° C.; 0.3-2 bar; 28 cm$^2$ filter area). An MFI-strand of the filtered material has been produced and examined by XRF-measurements. The titanium content was 0.0028 wt.-%.

Thus, a very high purification efficiency of 99.9% with respect to the $TiO_2$-pigments could be achieved.

For extract solutions of the same PE-concentration an increase in the service life of the filter by a factor of 20 could be achieved by using a filtration aid whilst also maintaining the purification performance.

EXAMPLE B

PE from Post-Consumer Flexible Waste

Post-consumer flexible waste material has been extracted and filtered in the same way as described in example A.

B1) Coarse filtration without filtration aid

Subsequently, the extract solution has been filtered by means of a coarse filter such as in example A1. The resulting coarsely filtered PE-solution has a green-brown (olive) colour and showed many fine dispersed dark-grey impurities. A microscopic analysis (frame size: 0.4 mm$^2$) of a film blown from the finely filtered material has revealed that the filtration has not been effective. The sample contained 2678 particles formed by impurities. Their size can be derived from the particle size distribution diagram in FIG. 1. The biggest particles show a considerable size of up to 400 µm.

B2) Fine filtration without filtration aid

The impurities caused blocking of the applied fine filter after filtration of 10 g PE only.

B3) Fine filtration with a solid filter aid

The use of a massive excess of a solid filter aid (25% related to dissolved PE), e.g. Celite™, could increase the throughput up to 35 g PE (dissolved in hot solutions of 3.5% to 8.5% concentration).

B4) Fine filtration of the supernatant

To the same extent as in example B3 the fine-filtration throughput was increased by using the supernatant after 1 h to 2.0 h sedimentation of the coarse-filtered PE-solution.

Thus (even with applied accelerated sedimentation of the hot PE-solution in centrifugal field) there were no means to achieve a robust (long-lasting) fine filtration of the PE-solution by non-expensive methods (affordable by the low commercial price of the recovered PE). E.g. the cost of single-use dead end filters and/or consumption of filter aids including their later disposal are much too high for achieving a profitable application.

And from a technical view the throughput of the fine-filter is too low in relation to the necessary cleaning/CIP-expenses, filter media and used solvent amounts for rinsing. Additionally, the very small flows would require an expensive large filter device: A post-consumer-PE-dispersion of 5.8% concentration could be filtered at a rate of 0.001 g PE/(bar·cm$^2$·s) only.

B5) Fine filtration with a liquid filtration aid

A liquid filtration aid was added to the already coarsely filtered PE-solution. The liquid filtration aid was a second polar solvent, e.g. an alcohol, which accelerated the sedimentation of the impurities. As a result either a) a homogeneous liquid phase with a solid precipitate consisting in insoluble impurities or b) a second liquid phase was obtained. The settled impurities were separated mechanically from the PE-containing phase without any loss of PE.

Blocking of the fine filter only occurs at PE-amounts as high as 500-900 g when solutions of 4.5 wt.-% to 8.0 wt.-% PE are used. In comparison to the filter blocking observed in example B1) this is an improvement factor of almost 2 orders of magnitude.

A pc-PE-dispersion of 5.6 wt.-% concentration could be filtered at a rate of 0.1 g PE/(bar·cm$^2$·s). Necessary filter devices can be much smaller (cheaper) than in comparative example B4.

Figure 2:
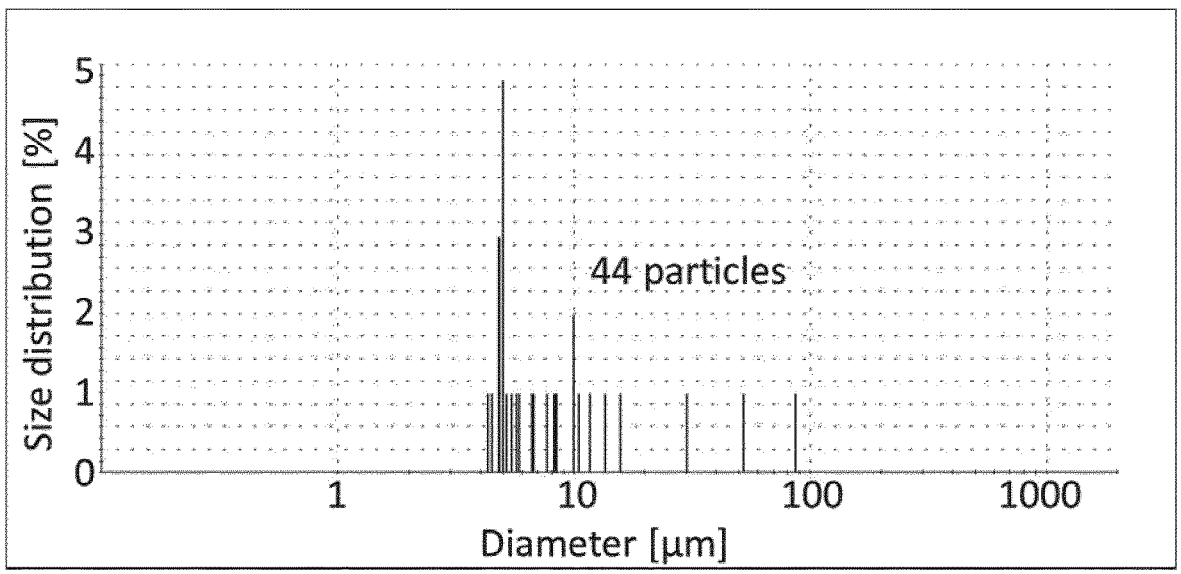

The microscopic analysis (frame size: 0.4 mm$^2$) of a film which has been blown from the PE recycle confirmed that also the amount of impurities could be reduced considerably. The sample contained only 44 particles formed by impurities. This corresponds to reduction of impurities (fines) by means of liquid filtration aid of 98%. Additionally, it can be concluded from the particle size distribution diagram in FIG. 2 that the impurities in the recyclate are smaller (only up to 100 µm) than in the case of a filtration without a liquid filter aid (compare to FIG. 1).

Figure 3:
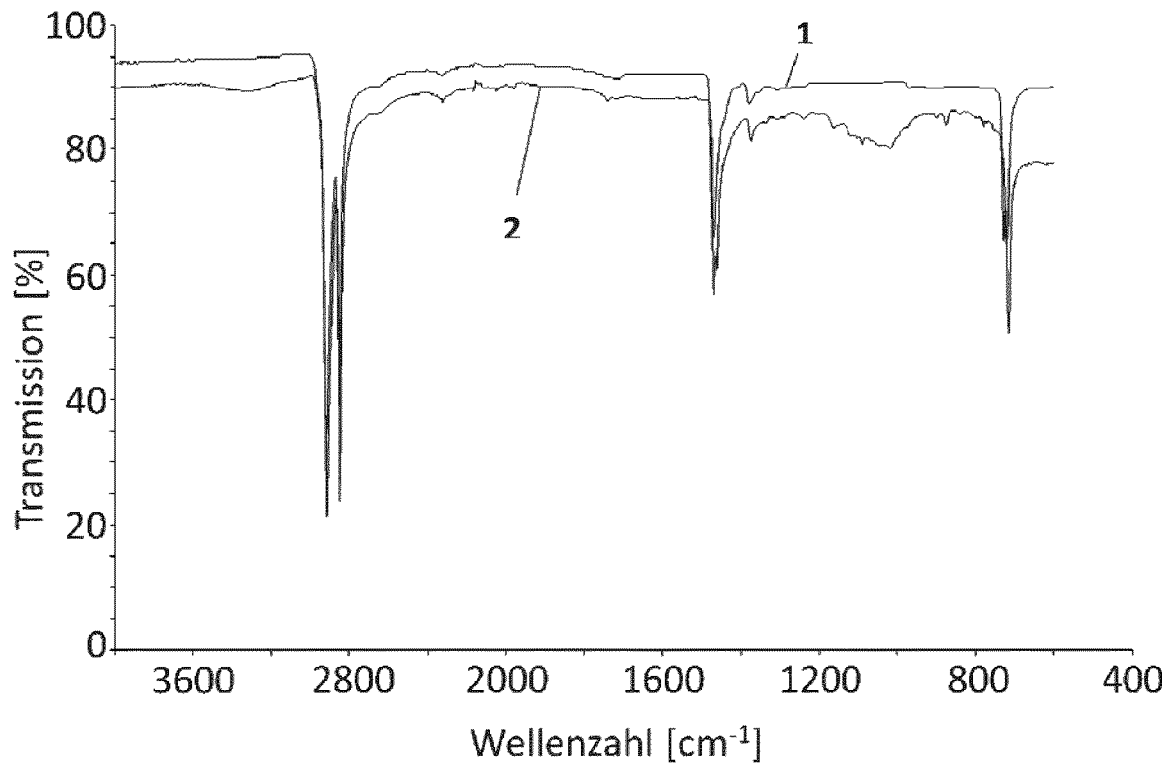
Figure 4:
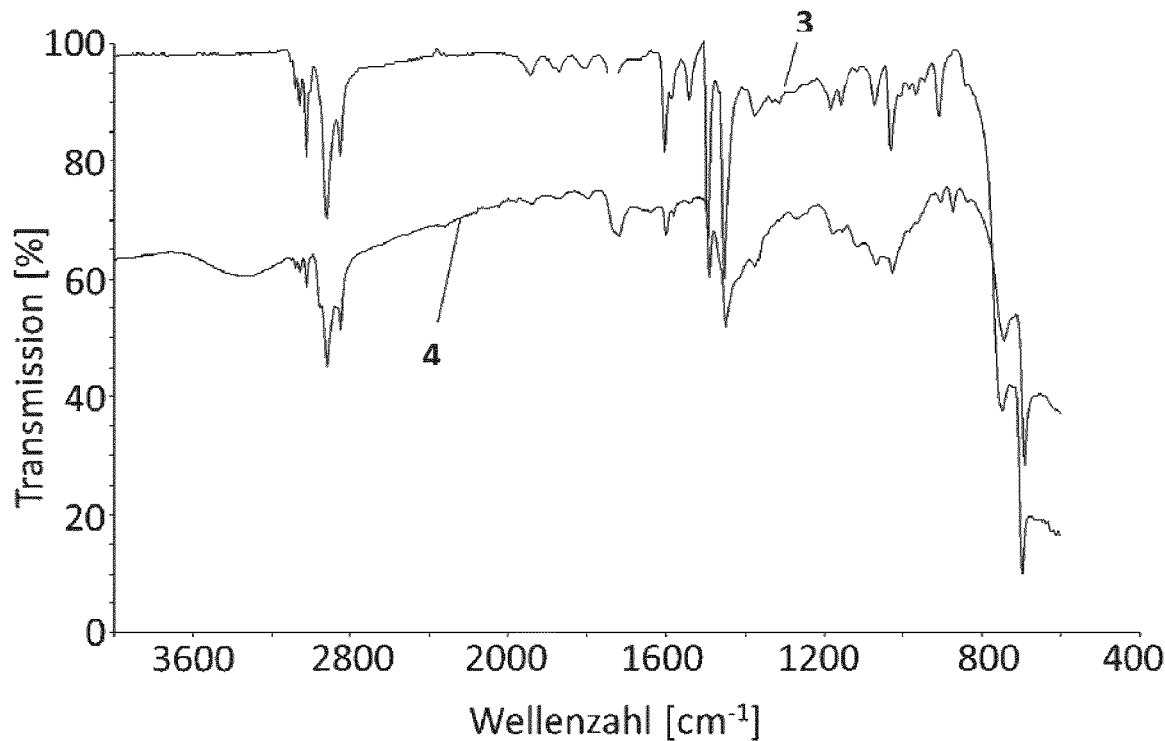

Moreover, after the process, the filtration aid fluid showed enrichments of bonding agents and other polymeric materials, such as adhesives and/or polystyrene based polymers. FIGS. 3 and 4 provide evidence for that.

In FIG. 3 the infrared spectrum of the material which has been isolated from the liquid filtration aid after it has been used in the recycling process (1) shows an absorption at the same wavenumbers as a the sample of a pure PE-based bonding agent with maleic anhydride (2). In FIG. 4 the IR-spectrum of the isolated precipitate (4) shows considerable agreement with the infrared spectrum of a pure polyurethane based coating (3). Without the use of the liquid filtration aid, these impurities would have been found in the final product, the PE-recyclate.

The invention claimed is:

1. A method for recycling a polyolefin containing waste comprising the following steps:
   a) mixing the polyolefin containing waste with a solvent having a Hansen parameter $\delta_H$ from 0.0 to 3.0 MPa$^{1/2}$;
   b) contacting the mixture from a) with a liquid filtration aid having a Hansen parameter $\delta_H \geq 4.0$ MPa$^{1/2}$; and
   c) separating the polyolefin from the mixture.

2. The method according to claim 1, wherein the polyolefin is selected from the group consisting of PE, PP, LDPE, HDPE, LLDPE, and mixtures thereof.

3. The method according to claim 1, wherein the solvent is selected from the group consisting of hydrocarbon compounds.

4. The method according to claim 3, wherein the hydrocarbon compounds are aliphatic hydrocarbon compounds.

5. The method according to claim 4, wherein the aliphatic hydrocarbon compounds are cyclo, linear, or branched aliphatic hydrocarbon compounds.

6. The method according to claim 1, wherein the liquid filtration aid contains at least one fluid with a Hansen-parameter $\delta_H$ from 4.0 to 38.0 MPa$^{1/2}$.

7. The method according to claim 6, wherein the liquid filtration aid forms a miscibility gap with the solvent.

8. The method according to claim 1, wherein the liquid filtration aid is at least one fluid selected from the group consisting of mono-/poly-hydroxy hydrocarbons with 2 to 12 carbon atoms.

9. The method according to claim 1, wherein the liquid filtration aid is at least one fluid selected from the group consisting of 1-propanol, 2-propanol, 1-butanol, 2-butanol, 1-pentanol, 2-pentanol, 3-pentanol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2,3-propanetriol, 1,2,4-butanetriol, 1,2,3-butanetriol, 2-(hydroxymethyl)-1,3-propanediol, 1,3,5-pentanetriol, 2,3,4-pentanetriol, 2-(hydroxymethyl)-2-methyl-propanediol, 2-propene-1-ol, propene-2-ol, 3-butene-1-ol, 2-buten-1-ol, 3-buten-2-ol, 1-butene-2-ol, (E)-2-Buten-1-ol, (Z)-2-Buten-1-ol, 2-methyl-2-propen-1-ol, 2-methyl-prop-1-en-1-ol, cyclopropylcarbinol, cyclobutanol, 1-penten-3-ol, 3-methyl-3-buten-1-ol, (Z)-2-penten-1-ol, 3-methyl-2-buten-1-ol, 2-methyl-3-buten-2-ol, (E)-2-penten-1-ol, 2-methyl-2-buten-1-ol, 4-penten-1-ol, 3-penten-2-ol, 2-penten-1-ol, 4-penten-2-ol, (Z)-2-penten-1-ol, (Z)-3-Penten-1-ol, 3-methyl-3-buten-2-ol, 3-penten-1-ol, (E)-2-penten-1-ol, (E)-3-penten-1-ol, 2-methyl-3-buten-1-ol, 2-penten-1-ol, pent-2-en-1-ol, 2-methyl-(E)-2-butenol, trans-3-penten-2-ol, 1-penten-3-ol, (Z)-pent-3-en-2-ol, (E)-pent-3-en-2-ol, prop-1-en-1,2-dimethyl-1-ol, 1-ethylcyclopropanol, 1-methylcyclopropanemethanol, cyclopentanol, cyclobutanemethanol, cyclopropylmethylcarbinol, 1,2-cyclopentanediol, and any combination thereof.

10. The method according to claim 1, wherein the polyolefin containing waste is selected from the group consisting of green dot collection waste, industrial waste, household-waste, bulky waste, packaging waste, rigid plastic waste and mixtures thereof and comprises or consists of multilayered plastic material and contaminant, wherein the multilayered plastic material contains
   at least one layer with at least 80.0 wt.-% of a polyolefin and
   at least another layer with at least 80.0 wt.-% of another polymer or polymer blend and
   optionally, a further layer comprising more than 20.0 wt.-% metal and/or paper.

11. The method according to claim 10, wherein the another polymer or polymer blend is selected from the group consisting of polyesters, polyethers, polyvinylacetate, polyvinylalcohols, ethylenevinylalcohols, polyamides, polyacrylates, polycarbonates, polyurethanes, aromatic polymers, blends thereof, and copolymers thereof.

12. The method according to claim 10, wherein the contaminant is selected from the group consisting of glass, fillers, flame retardants, papers, colorants, printing inks, whiteners, bonding agents, coatings, inert contaminants, foams, adhesives, metals, heavy metals, volatile organic substances, aromatic substances, halogenated aromatic substances, halogenated hydrocarbons, biologically degradable dirt, residual foodstuff, wood, textile fibres, natural fibres, and any combination thereof.

13. The method according to claim 1, wherein a temperature of 75 to 200° C. is applied in steps a) and b).

14. The method according to claim 1, wherein a temperature of 25 to 260° C. is applied in step c).

15. The method according to claim 1, wherein the mixture of step a) comprises from 2.0 to 40 wt.-% polymer.

16. The method according to claim 1, wherein the contacting time in step b) is at least 0.5 min.

17. The method according to claim 1, wherein the volume of the liquid filtration aid in step b) is from 0.5 to 100 wt.-%, in relation to the mixture of waste and solvent coming from step a).

18. The method according to claim 1, wherein the mixture is subjected to a separation process prior to step c).

19. The method according to claim 1, wherein the separation in step c) is effected by evaporation of the solvent or by addition of a precipitant followed by precipitation and mechanical separation of the polyolefin.

20. The method according to claim 1, wherein the separated polyolefin is directly fed into an extruder and processed to a polyolefin granulate compound, masterbatch or film or dried in a drying process and cooled to room temperature.

* * * * *